US009324222B2

(12) United States Patent
Buckley et al.

(10) Patent No.: US 9,324,222 B2
(45) Date of Patent: Apr. 26, 2016

(54) TAMPER RESISTANT MOTION DETECTOR

(71) Applicant: Honeywell International Inc., Morristown, NJ (US)

(72) Inventors: Mark Clifford Buckley, Camino, CA (US); David Eugene Merritt, Rocklin, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 261 days.

(21) Appl. No.: 13/780,743

(22) Filed: Feb. 28, 2013

(65) Prior Publication Data

US 2014/0240503 A1 Aug. 28, 2014

(51) Int. Cl.

| | |
|---|---|
| ***H04N 7/18*** | (2006.01) |
| ***H04N 5/765*** | (2006.01) |
| ***H04N 9/80*** | (2006.01) |
| ***G08B 13/26*** | (2006.01) |
| ***G08B 29/04*** | (2006.01) |

(52) U.S. Cl.

CPC .............. *G08B 13/26* (2013.01); *G08B 29/046* (2013.01)

(58) Field of Classification Search

None

See application file for complete search history.

(56) References Cited

U.S. PATENT DOCUMENTS

| | | | | |
|---|---|---|---|---|
| 6,377,174 | B1 * | 4/2002 | Siegwart et al. | 340/541 |
| 2008/0084292 | A1 * | 4/2008 | DiPoala | 340/522 |
| 2009/0167538 | A1 * | 7/2009 | Merritt et al. | 340/600 |
| 2010/0328056 | A1 * | 12/2010 | Merkel et al. | 340/435 |
| 2012/0161976 | A1 * | 6/2012 | Xie et al. | 340/686.6 |
| 2012/0188081 | A1 * | 7/2012 | Van Katwijk | 340/541 |
| 2012/0319842 | A1 * | 12/2012 | Amis | 340/540 |
| 2013/0113397 | A1 * | 5/2013 | Salter et al. | 315/362 |
| 2013/0240739 | A1 * | 9/2013 | Shpater | 250/353 |

OTHER PUBLICATIONS

Thomas Perme et al., Capacitive Touch Using Only an ADC ("CVD"), Microchip Technology Inc., AN1298, DSD1298-A, pp. 1-4, 2009.

Sensors, Atmel Delivers QTouch Capacitive Touch Controller, Nov. 16, 2011.

Atmel, QTouch 12-channel Touch Sensor IC, AT42QT2120 [Preliminary], 9634AX-AT42-11/11, 2011.

Atmel, Proximity Design Guide, Application Note QTAN0087, 10760A-AT42-11/11, 2011.

Cypress Semiconductor Corporation, Cypress Perform, PSoC Programmable System-on-Chip, Document No. 001-67345, Rev. *A, Revised May 13, 2011.

Cypress Semiconductor, Cypress Perform, CY3235-ProxDet, CapSense Proximity Detection Demonstration Kit Guide, Doc. #: 001-67986 Rev. *B, 2011.

NXP, PCA8886—Dual channel capacitive proximity switch with auto-calibration and large voltage operating range, Rev. 1—Nov. 23, 2011.

Sensors, Semtech Launches Smart Proximity Sensor, Jun. 25, 2012.

Mark Kretschmar, Lion Precision Sensors, Capacitive Sensor Operation Part 1: The Basics, May 1, 2009.

Mark Kretschmar, Lion Precision Sensors, Capacitive Sensor Operation Part 2: System Optimization, Jun. 1, 2009.

* cited by examiner

*Primary Examiner* — Hung Dang

(74) *Attorney, Agent, or Firm* — Husch Blackwell LLP

(57) ABSTRACT

A tamper resistant motion detector is provided that can include a housing, a capacitive sensor, and a microprocessor. The housing can include a window, and the capacitive sensor can be located inside of the housing, behind the window. A capacitance of the capacitive sensor can change when the capacitive sensor detects an object on the window or within a predetermined distance from the window, and the microprocessor can read the capacitance of the capacitive sensor and use the capacitance of the capacitive sensor to determine whether to activate an alarm or to determine whether to activate an anti-mask system.

10 Claims, 7 Drawing Sheets

Stand-alone capacitive anti-mask logic flow chart

Stand-alone capacitive anti-mask logic flow chart

TAMPER RESISTANT MOTION DETECTOR

FIELD

The present invention relates generally to motion detectors. More particularly, the present invention relates to a tamper resistant motion detector.

BACKGROUND

Motion detectors can form a part of an intrusion security system, but motion detectors can vary in both quality and the features that are included in the motion detector. Industry standards that describe the detection criteria and capability of motion detector features are written by the European Committee for Electromechanical Standardization: EN50131-2-2 for passive infrared (PIR) detectors and EN50131-2-4 for combined PIR and microwave detectors. The standards identify four different grades of motion detectors: Grade 1 has the lowest sensitivity and smallest feature set, and Grade 4 has the highest sensitivity and greatest feature set. Grade 1 and Grade 2 wireless detectors are known in the art. However, no wireless Grade 3 or Grade 4 motion detector exists in the marketplace.

Masking can occur when an associated motion detection system is unarmed, and any part of the motion detection system that requires a view of a monitored area can be masked. For example, if the motion detection system includes a PIR sensor, then a Fresnel lens or window that focuses heat energy onto the PIR sensor can be masked. Similarly, if the motion detection system includes an imager and a lens of the imager is exposed, then the lens can be masked. If the lens of the imager is recessed inside of a housing and covered with a transparent window, then the transparent window can also be masked.

Unlike Grade 1 and Grade 2 detectors, a Grade 3 motion detector must include an effective anti-mask system. For example, an effective anti-mask system can detect tampering with an associated motion detection system to the extent that the motion detection system can no longer detect motion. When the motion detection system includes a passive infrared (PIR) sensor, tampering that prevents the system from detecting motion can include the blocking of a lens or window to the PIR sensor with a masking material. For example, a masking material can include an IR opaque material, paper, Styrofoam, cardboard, spray paint, and clear lacquer, which allows visible light to pass, but blocks IR energy that a PIR sensor detects.

The reason that wireless Grade 3 motion detectors do not exist in the marketplace is that effective anti-mask systems, such as near infrared (NIR) emitters and detectors distributed around a lens or window, consume too much energy. When too much energy is consumed, an excessive number of batteries will be required to create a sensor with a viable battery life.

In view of the above, there is a continuing, ongoing need for a wireless Grade 3 motion detector that includes an effective anti-mask system.

DETAILED DESCRIPTION

Figure 1:
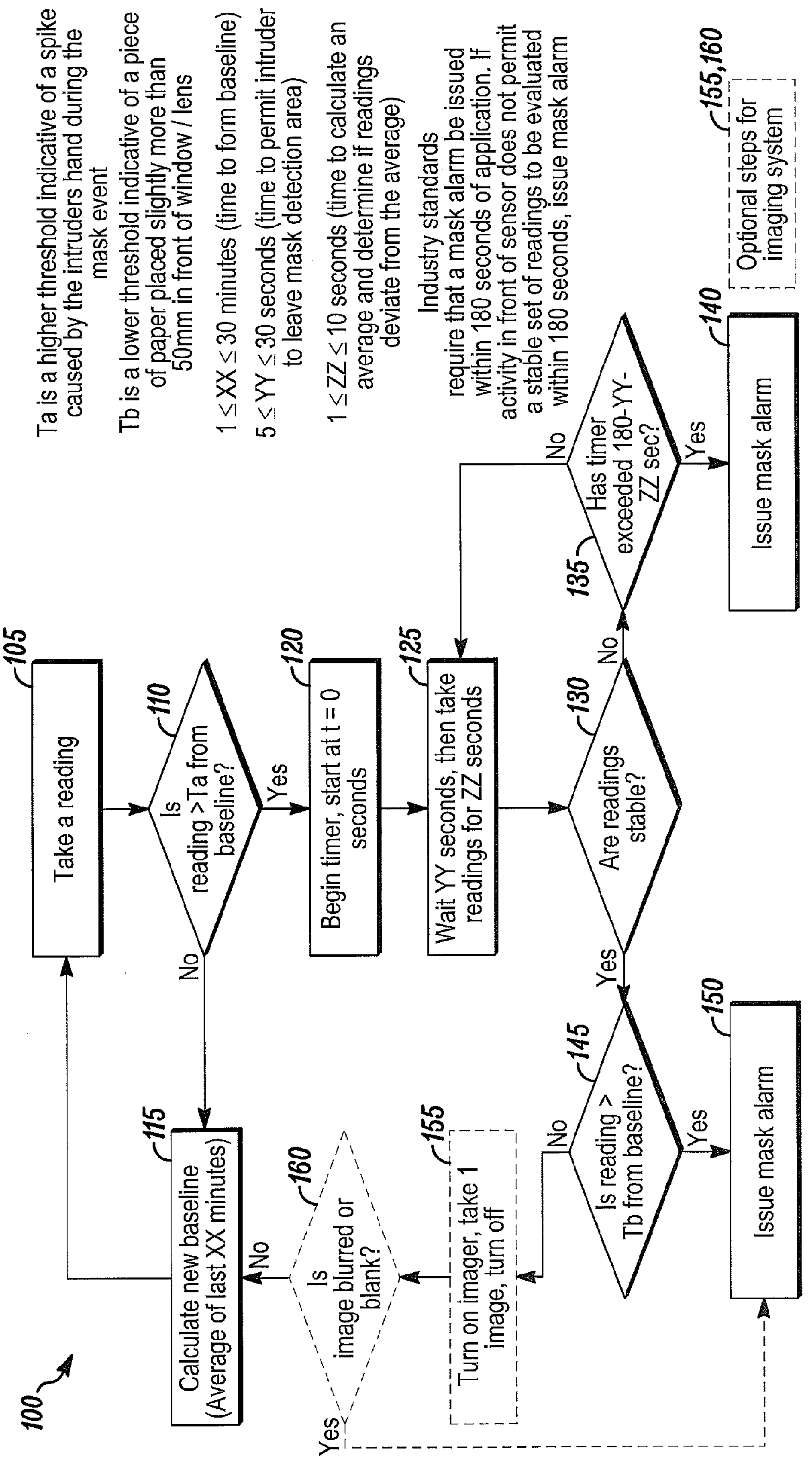
FIG. 1 is a flow diagram of a method of operating a capacitive anti-mask system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a wired or wireless motion detector that can include a video imager and a digital signal processor to permit true object recognition and discrimination. The wired or wireless motion detector disclosed herein can conform to Grade 3 industry standards. Accordingly, the motion detector disclosed herein can include both a motion detection system and an effective anti-mask system.

Figure 4:
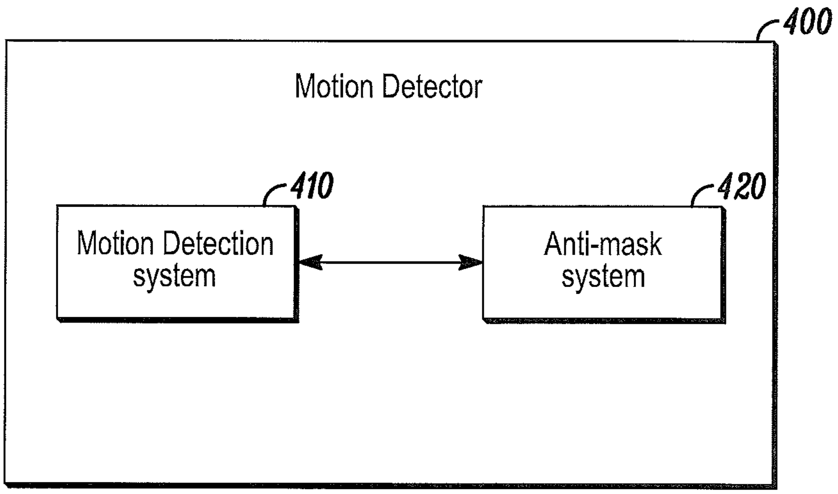
FIG. 4 is a block diagram of a motion detector in accordance with disclosed embodiments.

For example, FIG. 4 is a block diagram of a motion detector 400 in accordance with disclosed embodiments. As seen in FIG. 4, the motion detection system 410 can be in bidirectional communication with the anti-mask system 420. In some embodiments, the anti-mask system 420 can effectively detect mask material within approximately three minutes of the mask material being applied to the motion detector 400. In some embodiments, the anti-mask system 420 can effectively detect mask material by detecting a spray of the mask material, such as paint, while the spray is in the air and before the spray is on a lens or window of the motion detector 400.

It is to be understood that the window of the motion detector and systems disclosed herein can include all embodiments as would be understood by those of skill in the art. For example, the window can include any light or heat transmitting media that fills an aperture in a housing and that is used to pass energy from an intruder, through the housing aperture, to a light or heat sensor. For example, the aperture-filling media disclosed herein can include, but is not limited to, the lens of an imager, a Fresnel lens of a PIR system, a film in front of a PIR mirror, and an optically transparent membrane covering a lens of an imager.

In some wired embodiments, the anti-mask system 420 can be activated and/or powered on at all times for the life of the motion detector 400. This is possible because wired embodiments of the motion detector 400 can be provided with a continuous supply of power, which is adequate to continuously operate the anti-mask system 420.

However, in some wireless embodiments, at least the anti-mask system 420 can be deactivated and/or placed in a low power sleep state while the motion detector 400 is armed or while a system that includes the motion detector 400 is armed.

In these embodiments, the anti-mask system 420 can operate for approximately half of each day. However, even when powered for half of each day, the anti-mask system 420 will consume too much energy to allow for the creation of a viable wireless Grade 3 motion detector. Accordingly, an anti-mask system that consumes extremely low current and/or an anti-mask wake-up system is needed.

Embodiments disclosed herein can include a low current, effective anti-mask system. For example, a capacitive sensor in accordance with disclosed embodiments can sense the proximity of external objects, such as a masking material, and, when predetermined conditions are satisfied, the capacitive sensor disclosed herein can cause the anti-mask system to exit a low power sleep state.

The capacitive sensor disclosed herein can be active, that is, at full power, even when the anti-mask system and/or motion detector is armed. In some embodiments, the active capacitive sensor can consume low power, for example, approximately 5 μA at 3V. In these embodiments, if the system and/or detector is disarmed for 50% of the time for 5 years, then the capacitive sensor will consume approximately 109 mA hours. This is well within the energy budget for a wireless motion detector that complies with Grade 3 industry standards. As a comparison, two AA batteries in series will provide approximately 2900 mA hours at 3V. Accordingly, the capacitive sensor in accordance with disclosed embodiments can consume approximately 3.5% of the available energy when limited to two AA batteries.

According to one embodiment disclosed herein, a capacitive sensor can be a part of an independent anti-mask system and cause the independent anti-mask system to exit a low power sleep state when predetermined conditions are satisfied. In some embodiments, the capacitive sensor can detect mask materials at ranges specified by Grade 3 industry standards as part of a standalone or independent anti-mask system. That is, in some embodiments, the capacitive sensor need not require a second independent anti-mask system.

FIG. 1 is a flow diagram of a method 100 of operating a capacitive anti-mask system in accordance with disclosed embodiments. As seen in FIG. 1, the method 100 can include reading data from a capacitive sensor as in 105. For example, reading data from a capacitive sensor as in 105 can include reading multiple data samples in quick succession and averaging the multiple data samples. In some embodiments, reading data from a capacitive sensor as in 105 can include reading approximately 50 samples at approximately 1 microsecond intervals.

After the method 100 reads data from the capacitive sensor as in 105, the method 100 can determine whether the read data is greater than Ta from a baseline as in 110. For example, Ta can be a first threshold higher than a baseline and can be indicative of a spike caused by a mask event, for example, an intruder's hand placed in front of a window and/or lens of the motion detector.

If the method 100 determines that the read data is not greater than Ta from the baseline as in 110, then the method 100 can calculate a new baseline as in 115 and read data from the capacitive sensor as in 105. For example, the new baseline calculated as in 115 can include an average of data read in the last XX number of minutes. XX can include a period of time to form a new baseline, and XX can be greater than or equal to approximately 1 minute and less than or equal to approximately 30 minutes, that is, $1 \le XX \le 30$.

However, if the method 100 determines that the read data is greater than Ta from the baseline as in 110, then the method 100 can start a timer as in 120 and set the timer to 0 seconds. Then, the method 100 can wait YY seconds and read data from the capacitive sensor for ZZ seconds as in 125. For example, YY can include a period of time to permit an intruder to exit a mask detection area, and YY can be greater than or equal to approximately 5 seconds and less than or equal to approximately 30 seconds, that is, $5 \le YY \le 30$ seconds. Similarly, ZZ can include a period of time to calculate an average and determine whether readings deviate from the average. ZZ can be greater than or equal to approximately 1 second and less than or equal to approximately 10 seconds, that is, $1 \le ZZ \le 10$.

After the method 100 reads data from the capacitive sensor for ZZ seconds as in 125, the method 100 can determine whether the data readings are stable as in 130. If the method 100 determines that the data readings are not stable as in 130, then the method 100 can determine whether the timer has exceeded 180-YY-ZZ seconds as in 135.

Grade 3 industry standards require that a mask alarm be issued within 180 seconds of mask application. Accordingly, if activity in front of a sensor does not permit a stable set of readings to be evaluated within 180 seconds, then a mask alarm must be issued. In view of these standards, if the method 100 determines that the timer has exceeded 180-YY-ZZ seconds as in 135, then the method 100 can issue a mask alarm as in 140. However, if the method 100 determines that the timer has not exceeded 180-YY-ZZ seconds as in 135, then the method 100 can wait YY seconds and continue reading data from the capacitive sensor for ZZ seconds as in 125.

If the method 100 determines that the data readings are stable as in 130, then the method 100 can determine whether read data is greater than Tb from the baseline as in 145. For example, Tb can be a second threshold higher than the baseline, but lower than Ta, and can be indicative of a mask object, such as a piece of paper, being located a predetermined distance, for example, approximately 50 mm, in front of a window and/or lens of a detector.

If the method 100 determines that the read data is greater than Tb from the baseline as in 145, then the method 100 can issue a mask alarm as in 150. However, if the method 100 determines that the read data is not greater than Tb from the baseline as in 145, then the method 100 can calculate a new baseline as in 115 and read data from the capacitive sensor as in 105.

In some embodiments, after the method 100 determines that the read data is not greater than Tb from the baseline as in 145, the method 100 can turn on a video imager, capture one or more images, and turn off the imager as in 155. Then, the method 100 can determine whether the captured image is blurred or blank as in 160. If the method 100 determines that the captured image is blurred or blank as in 160, then the method 100 can issue the mask alarm as in 150. However, if the method 100 determines that the captured image is not blurred or blank as in 160, then the method 100 can calculate a new baseline as in 115 and read data from the capacitive sensor as in 105.

Figure 5:
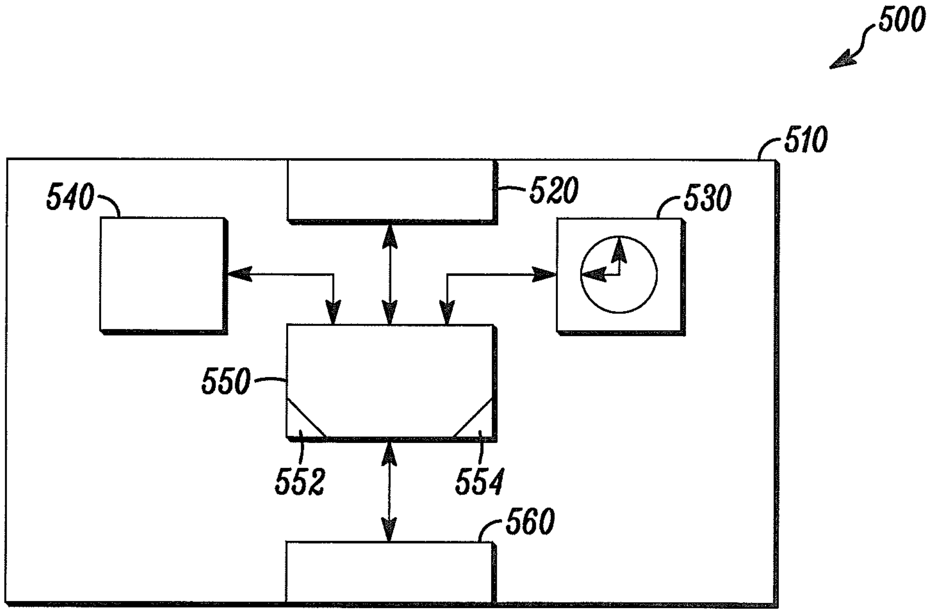
FIG. 5 is a block diagram of a system for carrying out the method of FIG. 1 and others in accordance with disclosed embodiments.

FIG. 5 is a block diagram of a system 500 for carrying out the method of FIG. 1 and others in accordance with disclosed embodiments. As seen in FIG. 5, a motion detector 510 can house a capacitive sensor 520, a timer 530, a mask alarm 540, control circuitry 550, one or more programmable processor 552, and executable control software 554 stored on a transitory or non-transitory computer readable medium, including but not limited to, computer memory, RAM, optical storage media, magnetic storage media, flash memory, and the like. In some methods, the executable control software 554 can implement the steps of method 100 shown in FIG. 1 as well as others disclosed herein.

For example, the control circuitry 550, programmable processor 552, and/or executable control software 554 can read data from the capacitive sensor 520 and compare the read data to a baseline to determine whether the read data is indicative of a mask event. If the read data is not indicative of a mask event, then the control circuitry 550, programmable processor 552, and/or executable control software 554 can calculate a new baseline and continue reading data from the capacitive sensor 520.

However, if the read data is indicative of a mask event, then the control circuitry 550, programmable processor 552, and/or executable control software 554 can start the timer 530 and set the timer 530 for 0 seconds. Then, the control circuitry 550, programmable processor 552, and/or executable control software 554 can wait a sufficient period of time for an intruder to leave a mask detection area and read data from the capacitive sensor 520 for a sufficient period of time to calculate an average and determine if readings deviate from the calculated average.

The control circuitry 550, programmable processor 552, and/or executable control software 554 can determine whether the data readings are stable with respect to the average. If the data readings are not stable, then the control circuitry 550, programmable processor 552, and/or executable control software 554 can determine whether the timer 530 has exceeded a predetermined period of time and, if so, activate the mask alarm 540. However, if the timer 530 has not exceeded the predetermined period of time, then the control circuitry 550, programmable processor 552, and/or executable control software 554 can wait a sufficient period of time for an intruder to leave a mask detection area and continue reading data from the capacitive sensor 520 for a sufficient period of time to calculate an average and determine if readings deviate from the calculated average.

If the data readings are stable, then the control circuitry 550, programmable processor 552, and/or executable control software 554 can determine whether read data is indicative of a mask object placed within a predetermined distance in front of the detector 510. If the read data is indicative of the mask object, then the control circuitry 550, programmable processor 552, and/or executable control software 554 can activate the mask alarm 540. However, if the read data is not indicative of a mask object, then the control circuitry 550, programmable processor 552, and/or executable control software 554 can calculate a new baseline and continue reading data from the capacitive sensor 520.

In some embodiments, the motion detector 500 can include a video imager 560, and, after the control circuitry 550, programmable processor 552, and/or executable control software 554 determines that read data is not indicative of a mask object, the control circuitry 550, programmable processor 552, and/or executable control software 554 can turn on the video imager 560, instruct the video imager 560 to capture one image, and turn off the video imager 560. Then, the control circuitry 550, programmable processor 552, and/or executable control software 554 can determine whether the captured image is blurred or blank. If the captured image is blurred or blank, then the control circuitry 550, programmable processor 552, and/or executable control software 554 can activate the mask alarm 560. However, if the captured image is not blurred or blank, then the control circuitry 550, programmable processor 552, and/or executable control software 554 can calculate a new baseline and read data from the capacitive sensor 520.

Although FIG. 5 shows a motion detector that includes a capacitive anti-mask system, it is to be understood that the capacitive anti-mask system disclosed herein is not limited to motion detectors. For example, the capacitive anti-mask system disclosed herein can be employed in connection with a glass break detector. The glass break detector can include an acoustic entry hole or aperture on the outside of a housing that leads to a grommet that leads to a microphone. The glass break detector can be masked by plugging the acoustic entry hole in the housing, for example, by placing a piece of chewing gum in the hole. However, when the glass break detector includes the capacitive anti-mask system in accordance with disclosed embodiments, the capacitive anti-mask system can detect the chewing gum in the acoustic entry hole of the housing.

According to another embodiment disclosed herein, a capacitive sensor can transmit a signal to an independent anti-mask system to cause the anti-mask system to exit a low power sleep state when predetermined conditions are satisfied. For example, the capacitive sensor disclosed herein can detect a mask material, for example, an object the size of a human hand or larger, that comes within a predetermined distance of the motion detector, for example, within approximately 12 inches of the motion detector. When the capacitive sensor detects a mask material within the predetermined distance from the motion detector, the capacitive sensor can transmit a signal to cause the independent anti-mask system to exit a low power sleep state.

Some embodiments of the independent anti-mask system disclosed herein can include a robust near infrared (NIR) emitter/detector system. In some embodiments, the NIR anti-mask system can consume approximately 1.5 mA. If the NIR anti-mask system were active even when the anti-mask system and/or motion detector were disarmed, and if the system and/or detector were disarmed for 50% of the time for 5 years, then the NIR anti-mask system would consume approximately 33,000 mA hours. This is equivalent to the energy in approximately 11 AA batteries.

However, the NIR anti-mask system of some embodiments disclosed herein can be activated only when a mask material is detected within a predetermined distance from the motion detector, that is, when the NIR anti-mask system receives a signal to exit a low power sleep state. For example, if, for each mask event, a mask material is within the predetermined distance from the motion detector for 5 seconds, and a mask event occurs once per week for 5 years, then the NIR anti-mask system will be active for approximately 0.36 hours and consume approximately 0.54 mA hours. This is less than 1% of energy in a single AA battery. Accordingly, even when the approximately 0.54 mA hours consumed by the NIR anti-mask system is combined with the approximately 109 mA hours consumed by the capacitive sensor itself, the energy budget for the motion detector can still conform with that of a wireless motion detector that conforms to Grade 3 industry standards.

Figure 2:
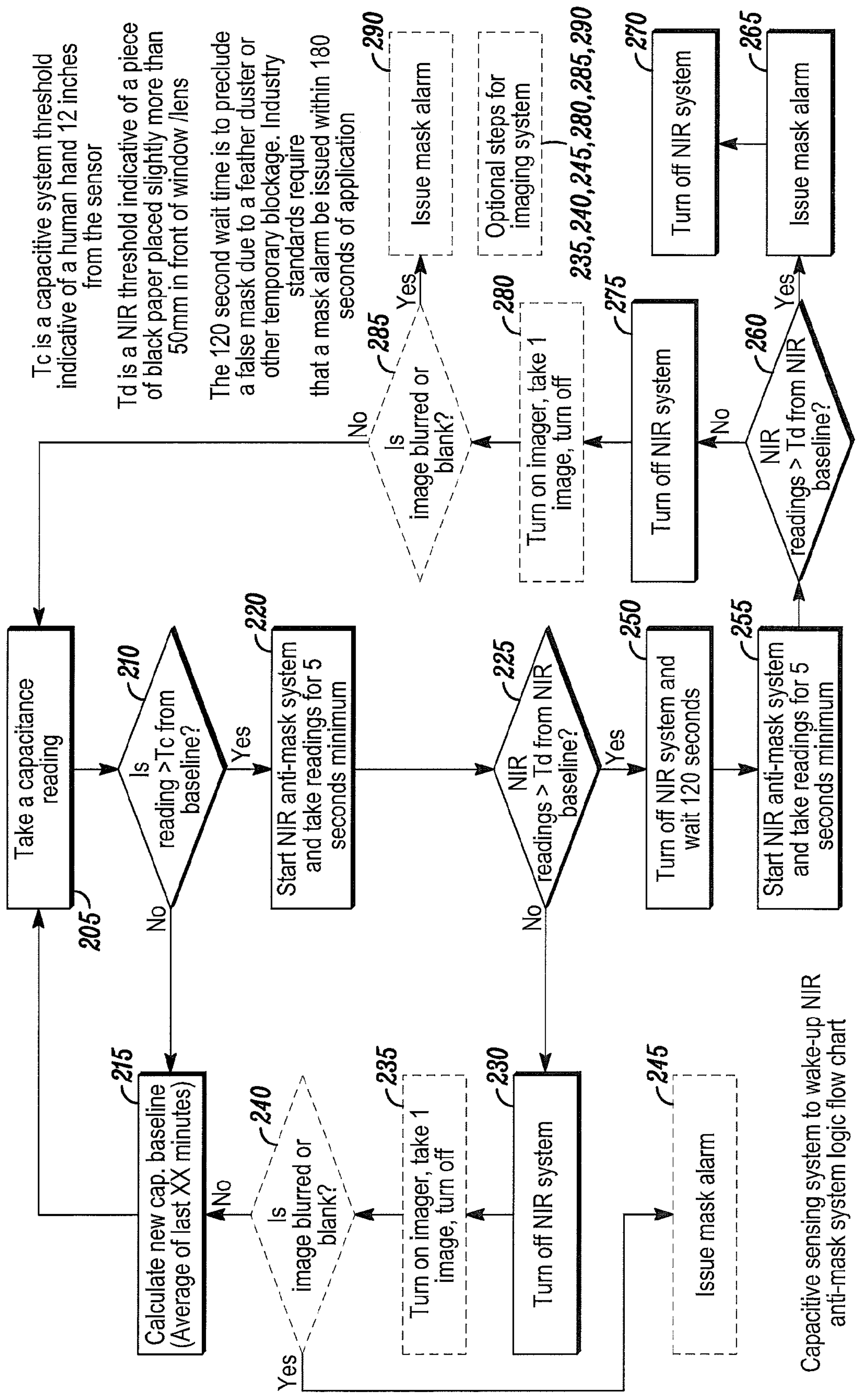
FIG. 2 is a flow diagram of a method of operating a capacitive sensing system to wake up an NIR anti-mask system in accordance with disclosed embodiments.

FIG. 2 is a flow diagram of a method 200 of operating a capacitive sensing system to wake up an NIR anti-mask system in accordance with disclosed embodiments. As seen in FIG. 2, the method 200 can include reading data from a capacitive sensor as in 205. Then, the method 200 can determine whether the read data is greater than Tc from a baseline as in 210. For example, Tc can be a capacitive system threshold that is indicative of a masking object within a predetermined distance from the capacitive sensor, for example, an object the size of a human hand within approximately 12 inches from the sensor.

If the method 200 determines that the read data is not greater than Tc from the baseline as in 210, then the method 200 can calculate a new capacitive baseline as in 215. For example, the new baseline calculated as in 215 can include an average of data read in the last XX number of minutes. Then, the method 200 can continue reading data from the capacitive sensor as in 205.

However, if the method 200 determines that the read data is greater than Tc from the baseline as in 210, then the method 200 can activate the NIR anti-mask system and read NIR anti-mask system data for at least a predetermined period of time, for example, approximately 5 seconds, as in 220. Then, the method 200 can determine whether the read NIR anti-mask system data is greater than Td from an NIR baseline as in 225. For example, Td can be an NIR threshold that is indicative of a masking object placed at a predetermined distance in front of a window and/or lens of the motion detector, for example, black paper placed approximately 50 mm in front of the window and/or lens.

If the method 200 determines that the read NIR anti-mask system data is not greater than Td from the baseline as in 225, then the method 200 can deactivate the NIR anti-mask system as in 230. Then, the method 200 can turn on a video imager, capture one image, and turn the video imager off as in 235 and determine whether the captured image is blurred or blank as in 240.

If the method 200 determines that the captured image is blurred or blank as in 240, then the method 200 can issue a mask alarm as in 245. However, if the method 200 determines that the captured image is not blurred or blank as in 240, then the method 200 can calculate a new capacitive baseline as in 215 and continue reading data from the capacitive sensor as in 205.

If the method 200 determines that the read NIR anti-mask system data is greater than Td from the baseline as in 225, then the method 200 can turn off the NIR anti-mask system and wait a predetermined period of time, for example, approximately 120 seconds, as in 250. In some embodiments, the method 200 can wait for the predetermined period of time to preclude the detection of a false mask, such as a feather duster or other temporary blockage. However, Grade 3 industry standards require that a mask alarm be issued within 180 seconds of mask application.

Accordingly, after the method turns off the NIR anti-mask system and waits the predetermined period of time as in 250, the method 200 can restart the NIR anti-mask system and read NIR anti-mask system data for at least a predetermined period of time, for example, 5 seconds, as in 255. Then, the method 200 can determine whether the data read from the NIR anti-mask system is greater than Td from the NIR baseline as in 260.

If the method 200 determines that the data read from the NIR anti-mask system is greater than Td from the NIR baseline as in 260, then the method 200 can issue a mask alarm as in 265 and turn off the NIR anti-mask system as in 270. However, if the method 200 determines that the data read from the NIR anti-mask system is not greater than Td from the NIR baseline as in 260, then the method 200 can turn off the NIR system as in 275 and continue reading data from the capacitive sensor as in 205.

In some embodiments, after the method 200 turns off the NIR system as in 275, the method 200 can turn on the video imager, capture one or more images, and turn off the video imager as in 280. Then, the method 200 can determine whether the captured image is blurred or blank as in 285. If the method 200 determines that the captured image is blurred or blank as in 285, then method 200 can issue a mask alarm as in 290. However, if the method 200 determines that the captured image is not blurred or blank as in 285, then the method 200 can continue reading data from a capacitive sensor as in 205.

Figure 6:
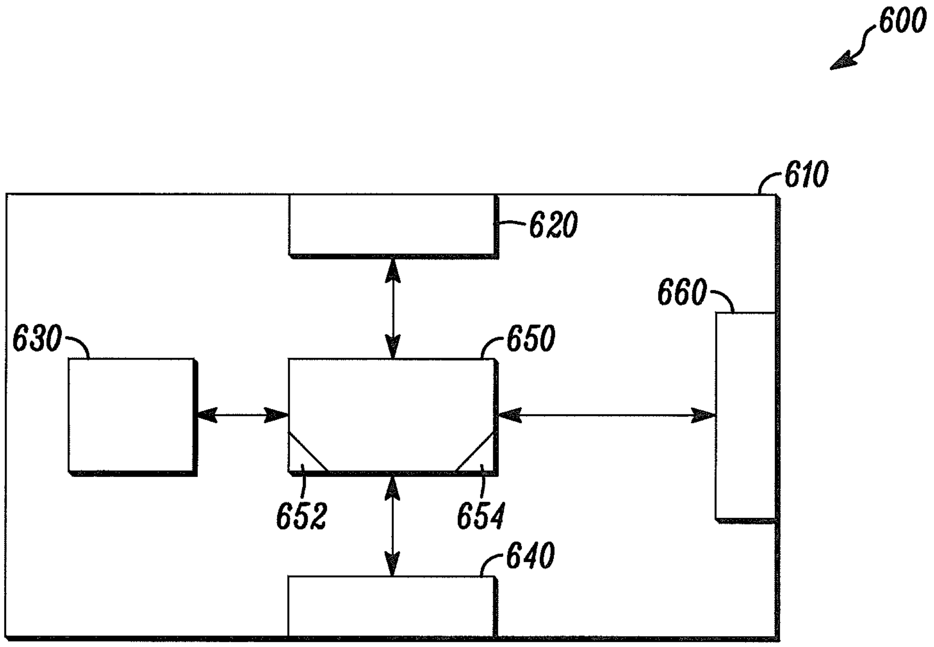
FIG. 6 is a block diagram of a system for carrying out the method of FIG. 2 and others in accordance with disclosed embodiments.

FIG. 6 is a block diagram of a system 600 for carrying out the method 200 of FIG. 2 and others in accordance with disclosed embodiments. As seen in FIG. 6, a motion detector 610 can house a capacitive sensor 620, a mask alarm 630, an NIR anti-mask system 640, a video imager 660, control circuitry 650, one or more programmable processor 652, and executable control software 654 stored on a transitory or non-transitory computer readable medium, including but not limited to, computer memory, RAM, optical storage media, magnetic storage media, flash memory, and the like. In some methods, the executable control software 654 can implement the steps of method 200 shown in FIG. 2 as well as others disclosed herein.

For example, the control circuitry 650, programmable processor 652, and/or executable control software 654 can read data from the capacitive sensor 620 and determine whether the read data is indicative of a masking object within a predetermined distance from the capacitive sensor 620. If the read data is not indicative of a masking object within a predetermined distance from the capacitive sensor, then the control circuitry 650, programmable processor 652, and/or executable control software 654 can calculate a new capacitive baseline and can continue reading data from the capacitive sensor 620.

However, if the control circuitry 650, programmable processor 652, and/or executable control software 654 determines that the read data is indicative of a masking object within a predetermined distance from the capacitive sensor, then the control circuitry 650, programmable processor 652, and/or executable control software 654 can activate the NIR anti-mask system 640 and read data from the NIR anti-mask system 640 for at least a predetermined period of time. Then, the control circuitry 650, programmable processor 652, and/or executable control software 654 can determine whether the data read from the NIR anti-mask system 640 is indicative of a masking object present within a predetermined distance from the motion detector 610.

If the control circuitry 650, programmable processor 652, and/or executable control software 654 determines that the data read from the NIR anti-mask system 640 is not indicative of a masking object present within a predetermined distance from the motion detector, then the control circuitry 650, programmable processor 652, and/or executable control software 654 can deactivate the NIR anti-mask system 640. Then, the control circuitry 650, programmable processor 652, and/or executable control software 654 can turn on a video imager 660, instruct the video imager 660 to capture one or more images, and turn off the video imager 660. The control circuitry 650, programmable processor 652, and/or executable control software 654 can also determine whether the captured image is blurred or blank.

If the control circuitry 650, programmable processor 652, and/or executable control software 654 determines that the captured image is blurred or blank, then the control circuitry 650, programmable processor 652, and/or executable control software 654 can activate the mask alarm 630. However, if the control circuitry 650, programmable processor 652, and/or executable control software 654 determines that the captured image is not blurred or blank, then the control circuitry 650, programmable processor 652, and/or executable control software 654 can calculate a new capacitive baseline and continue reading data from the capacitive sensor 620.

If the control circuitry 650, programmable processor 652, and/or executable control software 654 determines that the data read from the NIR anti-mask system 640 is indicative of a masking object present within a predetermined distance from the motion detector, then the control circuitry 650, programmable processor 652, and/or executable control software 654 can turn off the NIR anti-mask system 640 and wait a predetermined period of time. Then, the control circuitry 650, programmable processor 652, and/or executable control software 654 can restart the NIR anti-mask system 640 and continue reading data from the NIR anti-mask system 640 for at least a predetermined period of time. The control circuitry 650, programmable processor 652, and/or executable control software 654 can also determine whether the data read from the NIR anti-mask system 640 is indicative of a masking object present within a predetermined distance from the motion detector.

If the control circuitry 650, programmable processor 652, and/or executable control software 654 determines that the data read from the NIR anti-mask system 640 is indicative of a masking object present within a predetermined distance from the motion detector, then the control circuitry 650, programmable processor 652, and/or executable control software 654 can activate the mask alarm 630 and turn off the NIR anti-mask system 640. However, if the control circuitry 650, programmable processor 652, and/or executable control software 654 determines that the data read from the NIR anti-mask system 640 is not indicative of a masking object present within a predetermined distance from the motion detector, then the control circuitry 650, programmable processor 652, and/or executable control software 654 can turn off the NIR system 640 and continue reading data from the capacitive sensor 640.

In some embodiments, after the control circuitry 650, programmable processor 652, and/or executable control software 654 turns off the NIR system, the control circuitry 650, programmable processor 652, and/or executable control software 654 can turn on the video imager 660, instruct the video imager 660 to capture one or more images, and turn off the video imager 660. Then, the control circuitry 650, programmable processor 652, and/or executable control software 654 can determine whether the captured image is blurred or blank, and, if so, activate the mask alarm 630. However, if the captured image is not blurred or blank, then the control circuitry 650, programmable processor 652, and/or executable control software 654 continue reading data from the capacitive sensor 620.

Some embodiments disclosed herein can eliminate the need for an NIR anti-mask system that employs an NIR emitter/detector system. Instead, these embodiments can employ the motion detector's imager and PIR systems that include a video imager and a PIR sensor. In these embodiments, the anti-mask system can receive a signal from a capacitive sensor instructing the imager and PIR system to exit a low power sleep state.

In some embodiments, a video imager disclosed herein cannot capture a masking object placed directly on a lens or window of the PIR portion of a motion detector. However, the video imager can capture any object that is more than a predetermined distance from the lens or window of the motion detector, for example, approximately 50 mm.

In some embodiments, a video imager can capture and/or track an object within a first predetermined distance from the motion detector, for example, approximately 35 feet. Accordingly, the video imager can track the object as it moves within an area that is within the first predetermined distance from the motion detector. In these embodiments, a PIR sensor within the motion detector can detect motion based on the heat energy of the object within the protected area. A capacitive sensor can sense when an object has come within a second predetermined distance from a lens or window of the motion detector, for example, 12 inches. The capacitive sensor can then sense when the object has left the area that is within the second predetermined distance from the lens or window. At that time, the imager can track the object as it leaves the area, and signals from the PIR sensor can be reviewed.

For example, while the imager is tracking the object, if the PIR sensor transmits signals indicating that an object is within the area that is within the first predetermined distance, then the anti-mask system can determine that no mask alarm signal should transmitted. However, while the imager is tracking the object, if the PIR sensor does not transmit a signal indicating that an object is within the area that is within the first predetermined distance, then the anti-mask system can determine that a mask alarm signal should be transmitted.

Figure 3:
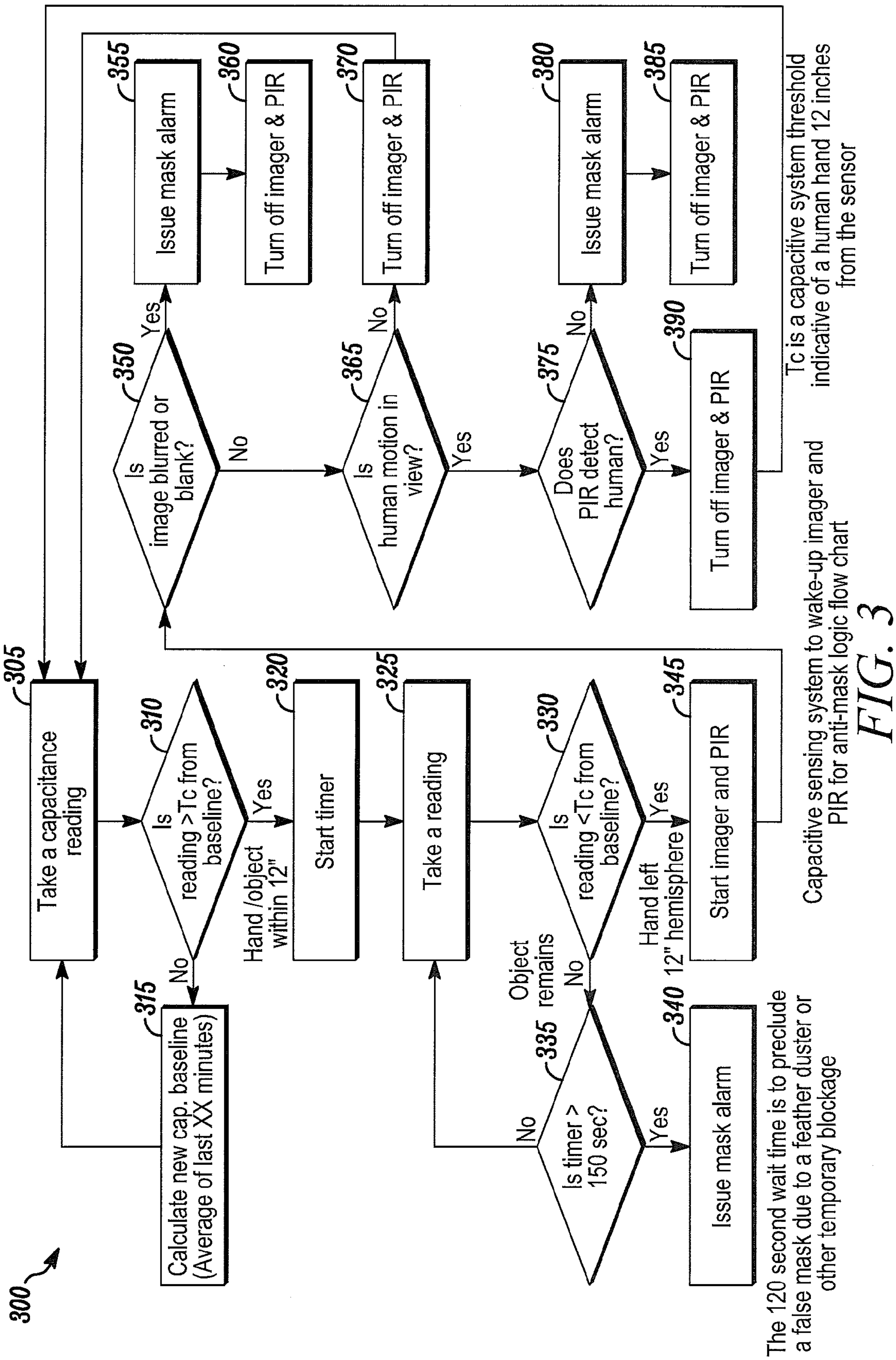
FIG. 3 is a flow diagram of a method of operating a capacitive sensing system to wake up an imager and a PIR motion sensor in accordance with disclosed embodiments.

FIG. 3 is a flow diagram of a method 300 of operating a capacitive sensing system to wake up an imager and a PIR motion sensor in accordance with disclosed embodiments. The capacitive sensing system, the imager, and the PIR motion sensor can all be contained within a single motion detector.

As seen in FIG. 3, the method 300 can include reading data from a capacitive sensor as in 305. Then, the method 300 can determine whether the read data is greater than Tc from a baseline as in 310. For example, Tc can be a capacitive system threshold that is indicative of a masking object within a predetermined distance from the capacitive sensor, for example, an object the size of a human hand within approximately 12 inches from the sensor.

If the method 300 determines that the read data is not greater than Tc from the baseline as in 310, then the method 300 can calculate a new capacitive baseline as in 315. For example, the new baseline calculated as in 315 can be an average of data read in the last XX number of minutes. Then, the method 300 can continue reading data from the capacitive sensor as in 305.

However, if the method 300 determines that the read data is greater than Tc from the baseline as in 310, that is, if the method 300 determines that the read data is indicative of an object within a predetermined distance from the motion detector, then the method 300 can start a timer as in 320 and continue reading data from the capacitive sensor as in 325. Then, the method 300 can determine whether the read data is less than Tc from the baseline as in 330.

If the method 300 determines that the read data is not less than Tc from the baseline as in 330, that is, if the method 300 determines that the object remains within the predetermined distance from the motion detector, then the method 300 can determine whether the timer is greater than a predetermined period of time, for example, approximately 150 seconds, as in 335. In some embodiments, the method 300 can wait for the predetermined period of time to preclude the detection of a false mask, such as a feather duster or other temporary blockage.

If the method 300 determines that the timer is not greater than the predetermined period of time as in 335, then the method 300 can continue reading data from the capacitive sensor as in 325. However, if the method 300 determines that the timer is greater than the predetermined period of time as in 335, then the method can issue a mask alarm as in 340.

If the method 300 determines that the read data is less than Tc from the baseline as in 330, that is, if the method 300 determines that the object has left the area within the predetermined distance from the motion detector, then the method 300 can activate the motion detector's imager and PIR motion detection systems, that is, activate a video imager and a PIR sensor, as in 345, and determine whether an image captured by the video imager is blurred or blank as in 350.

If the method 300 determines that the captured image is blurred or blank as in 350, then the method 300 can issue a mask alarm as in 355 and deactivate the imager and PIR systems, that is, deactivate the video imager and PIR sensor, as in 360. However, if the method 300 determines that the captured image is not blurred or blank as in 350, then the method 300 can determine whether human motion is within the view captured by the video imager as in 365.

If the method 300 determines that human motion is not within the view captured by the video imager as in 365, then the method 300 can deactivate the imager and PIR systems, that is, deactivate the video imager and PIR sensor, as in 370, and continue reading data from the capacitive sensor as in 305. However, if the method 300 determines that human motion is within the view captured by the video imager as in 365, then the method 300 can determine whether the PIR sensor detects a human object as in 375.

If the method 300 determines that the PIR sensor does not detect a human object as in 375, then the method 300 can issue a mask alarm as in 380 and deactivate the imager and PIR systems, that is, deactivate the video imager and PIR sensor, as in 385. However, if the method 300 determines that the PIR sensor detects a human object as in 375, then the method 300 can deactivate the imager and PIR systems, that is, deactivate the video imager and PIR sensor, as 390, and continue reading data from the capacitive sensor as in 305.

Figure 7:
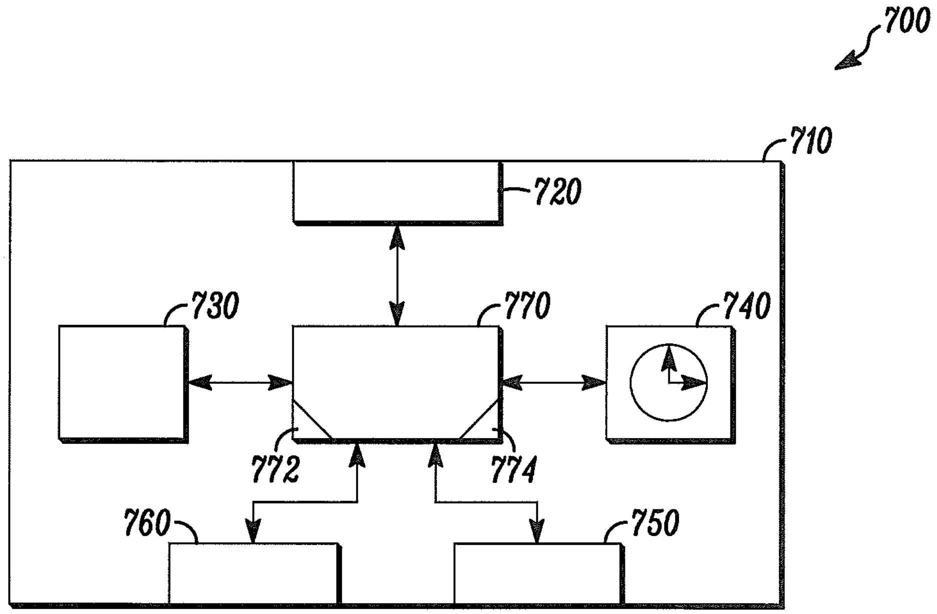
FIG. 7 is a block diagram of a system for carrying out the method of FIG. 3 and others in accordance with disclosed embodiments.

FIG. 7 is a block diagram of a system 700 for carrying out the method 300 of FIG. 3 and others in accordance with disclosed embodiments. As seen in FIG. 7, a motion detector 710 can house a capacitive sensor 720, a mask alarm 730, a timer 740, an imager motion detection system 750, a PIR motion detection system 760, control circuitry 770, one or more programmable processor 772, and executable control software 774 stored on a transitory or non-transitory computer readable medium, including but not limited to, computer memory, RAM, optical storage media, magnetic storage media, flash memory, and the like. In some methods, the executable control software 774 can implement the steps of method 300 shown in FIG. 3 as well as others disclosed herein.

For example, the control circuitry 770, programmable processor 772, and/or executable control software 774 can read data from the capacitive sensor 720 and determine whether the read data is indicative of a masking object within a predetermined distance from the capacitive sensor. If not, then the control circuitry 770, programmable processor 772, and/or executable control software 774 can calculate a new capacitive baseline and continue reading data from the capacitive sensor 720.

However, if the read data is indicative of a masking object within a predetermined distance from the capacitive sensor, then the control circuitry 770, programmable processor 772, and/or executable control software 774 can start the timer 740 and continue reading data from the capacitive sensor 720. Then, the control circuitry 770, programmable processor 772, and/or executable control software 774 can determine whether the masking object remains within the predetermined distance from the capacitive sensor 720.

If the masking object remains within the predetermined distance from the capacitive sensor, then the control circuitry 770, programmable processor 772, and/or executable control software 774 can determine if the timer 740 is greater than a predetermined period of time. If so, then the control circuitry 770, programmable processor 772, and/or executable control software 774 can activate the mask alarm 730, but if not, then the control circuitry 770, programmable processor 772, and/or executable control software 774 can continue reading data from the capacitive sensor 720.

If the signals from the capacitive sensor 720 indicate that the masking object has moved beyond the predetermined distance from the capacitive sensor 720, then the control circuitry 770, programmable processor 772, and/or executable control software 774 can activate the imager motion detection system 750 and the PIR motion detection system 760, that is, activate a video imager and a PIR sensor, instruct the video imager of the motion detection system 750 to capture an image, and determine whether the captured image is blurred or blank.

If the captured image is blurred or blank, then the control circuitry 770, programmable processor 772, and/or executable control software 774 can activate the mask alarm 730 and deactivate the imager motion detection system 750 and the PIR motion detection system 760, that is, deactivate the video imager and PIR sensor. However, if the captured image is not blurred or blank, then the control circuitry 770, programmable processor 772, and/or executable control software 774 can determine whether human motion is within the view captured by the video imager of the imager motion detection system 750.

If human motion is not within the view captured by the video imager of the imager motion detection system 750, then the control circuitry 770, programmable processor 772, and/or executable control software 774 can deactivate the imager motion detection system 750 and the PIR motion detection system 760, that is, deactivate the video imager and PIR sensor, and continue reading data from the capacitive sensor 720. However, if human motion is within the view captured by the video imager, then the control circuitry 770, programmable processor 772, and/or executable control software 774 can determine whether the PIR sensor of the PIR motion detection system 760 detects a human object.

If the PIR sensor of the PIR motion detection system 760 does not detect a human object, then the control circuitry 770, programmable processor 772, and/or executable control software 774 can activate the mask alarm 730 and deactivate the imager motion detection system 750 and the PIR motion detection system 760, that is, deactivate the video imager and the PIR sensor. However, if the PIR sensor of the PIR motion detection system 760 detects a human object, then the control circuitry 770, programmable processor 772, and/or executable control software 774 can deactivate the imager motion detection system 750 and the PIR motion detection system 760, that is, deactivate the video imager and the PIR sensor, and continue reading data from the capacitive sensor 720.

Figure 8A:
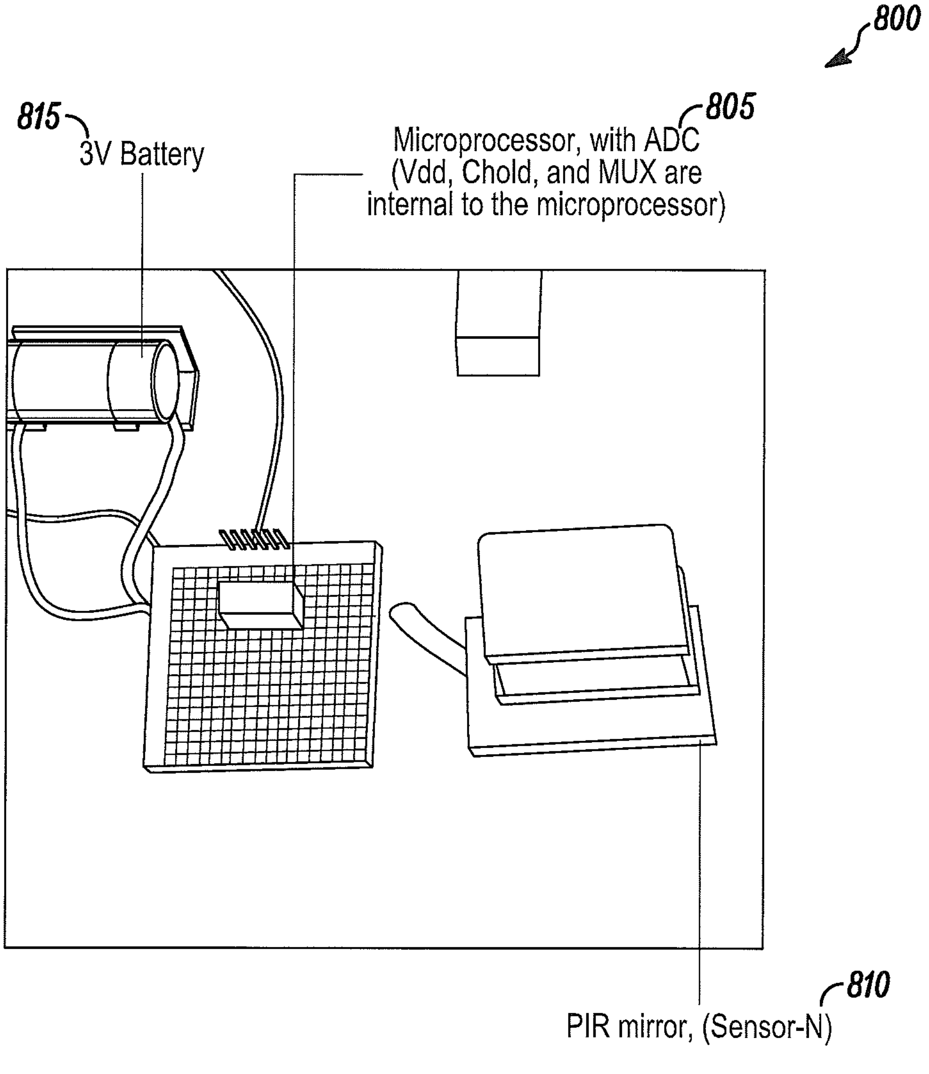
FIG. 8A is a perspective view of the interior of a system in accordance with disclosed embodiments.
Figure 8B:
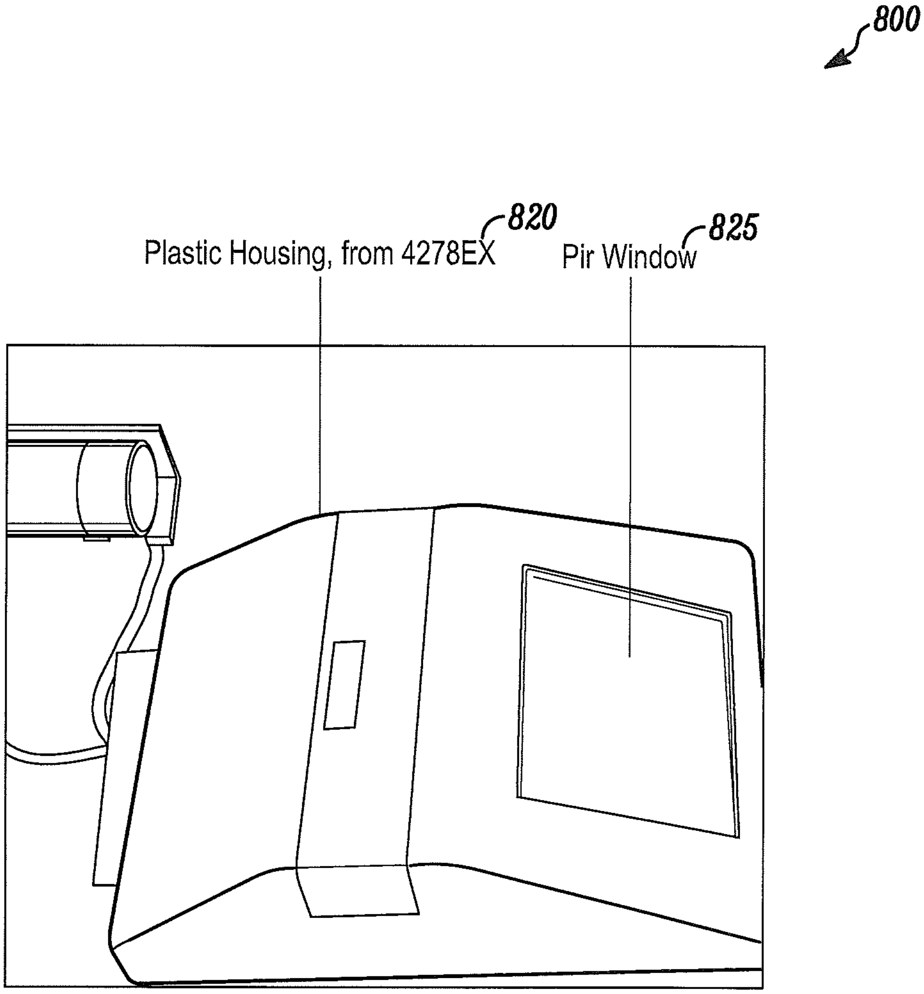
FIG. 8B is a perspective view of the exterior of a system in accordance with disclosed embodiments.

In some embodiments disclosed herein, the capacitive sensor can be incorporated into a PIR optical system. For example, in some embodiments, the capacitive sensor can include a capacitive antenna, which can include a large conductive surface, for example, a mirror. FIGS. 8A and 8B are perspective views of the interior and exterior, respectively, of a system 800 that incorporates a mirror 810.

As seen in FIG. 8, the system 800 can include a microprocessor 805 that can include an analog to digital converter (ADC) and an internal multiplexer (MUX). The microprocessor 805 can be capable of reading multiple pins, which can permit the microprocessor 805 to read both pyro and light sensor signals. In some embodiments, the ADC and the MUX of the microprocessor 805 can sample PIR sensors, for example, the mirror 810, as well as the supply voltage Vdd, for example, from the battery 815 or other power supply. Accordingly, the system 800 can perform capacitive sensing using a capacitive voltage divider (CVD) method as is known in the art.

In some embodiments, at least the microprocessor 805 and the mirror 810 can be included in a housing 820, which can include an infrared transmissive lens or window 825. The mirror 810 can be placed directly behind the window 825 to allow heat energy from an intruder to reach the mirror 810 and therefore, be focused on the PIR sensor. An intruder intent on masking or blinding the PIR sensor of the system 800 will cover the window 825 with a mask object or material so using the mirror 810 as an antenna in the capacitive system can place the antenna directly in line with the intruder's masking material.

In some embodiments, the ADC of the microprocessor 805 can read the supply voltage Vdd from the battery 815, which can charge an internal sample and hold capacitance Chold of the ADC. For example, Vdd can be 3.3V, Chold can be 100 pf, and the sensor capacitance, for example, the capacitance of the mirror 805, Csensor can be 10 pf. If a switch in the MUX is changed from Vdd to input, then the voltage across Chold can go down based on Csensor.

$$C\text{hold}=Vdd-(Vdd*(C\text{sensor}/(C\text{sensor}+C\text{hold}))) \quad (1)$$

That is, Chold can become 3V: 3.3−(3.3*(10/(10+100)))=3V.

In accordance with disclosed embodiments, when an object is introduced to an area around the sensor, for example, the mirror 810, the capacitance of the sensor 810 can change, which, as explained above, can change the voltage across Chold. For example, if an object is placed near the sensor, for example, the mirror 810, then Csensor can rise to 10.5 pf. Accordingly, Chold can become 2.985V: 3.3−(3.3*(10.5/(10+100)))=2.985. That is, Chold can shift downward by approximately 15 mV.

During a mask event, the capacitive sensor, for example, the mirror 810, can sense a large signal shift when a hand nears the sensor 810 and places a mask material over the window 825 to the sensor 810. However, the magnitude of the signal can decrease when the hand is removed. If the mask material is left on or near the window 825 to the sensor 810, then a measurable shift in the capacitive baseline can remain, and the system 800 can activate a mask alarm.

In some embodiments, a change in capacitance can be used to detect mask materials placed directly on the window 825 to the sensor 810. However, in some embodiments, when a mask material is placed a predetermined distance in front of the window 825 to the sensor 810, for example, approximately 50 mm, the sensor 810 can transmit a signal to cause a more robust NIR anti-mask system to exit a low power sleep state.

In these embodiments, when an object enters a predetermined area surrounding the system 800, for example, an approximately 12 inch radius hemisphere, NIR emitters in the anti-mask system and behind the window 825 to the sensor 810 can pulse at a high rate, and detectors behind the window 825 can measure reflected NIR energy. When an object blocks the window 825, signals from the NIR emitters can increase, and, when the increased signal level remains for more than a predetermined period of time, for example, approximately 2 minutes, the system 800 can activate a mask alarm. In some embodiments, the NIR anti-mask system can remain active until the object has exited the predetermined area surrounding the system 800 or until the mask alarm is activated.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:

reading data from a capacitive sensor located within an intrusion detector;

comparing the data from the capacitive sensor to a baseline to determine whether the data from the capacitive sensor is indicative of a masking material on or near an optical window of the intrusion detector; and when the data from the capacitive sensor is indicative of the masking material on or near the optical window of the intrusion detector, activating an anti-mask system to capture additional data from an ambient environment for determining whether to activate a mask alarm, wherein capturing the additional data from the ambient environment for determining whether to activate the mask alarm includes:

waiting a first predetermined period of time;

after expiration of the first predetermined period of time, reading data from the capacitive sensor for a second predetermined period of time;

determining whether the data from the capacitive sensor during the second predetermined period of time is stable;

when the data from the capacitive sensor during the second predetermined period of time is stable:

determining whether the data from the capacitive sensor during the second predetermined period of time is indicative of the masking material located within a predetermined distance from the optical window of the intrusion detector; and when the data from the capacitive sensor during the second predetermined period of time is indicative of the masking material located within the predetermined distance from the optical window of the intrusion detector, activating the mask alarm; and when the data from the capacitive sensor during the second predetermined period of time is not stable:

determining whether a third predetermined period of time has elapsed; and when the third predetermined period of time has elapsed, activating the mask alarm.

2. The method of claim 1 further comprising, when the data from the capacitive sensor during the second predetermined period of time is not indicative of the masking material located within the predetermined distance from the optical window, activating a video imager to capture at least one image, determining whether the captured image is blurred or blank, and when the captured image is blurred or blank, activating the mask alarm.

3. A method comprising:

reading data from a capacitive sensor located within an intrusion detector;

comparing the data from the capacitive sensor to a baseline to determine whether the data from the capacitive sensor is indicative of a masking material on or near an optical window of the intrusion detector; and when the data from the capacitive sensor is indicative of the masking material on or near the optical window of the intrusion detector, activating an anti-mask system to capture additional data from an ambient environment for determining whether to activate a mask alarm, wherein the anti-mask system includes an NIR (near infrared) anti-mask system, and wherein capturing the additional data from the ambient environment for determining whether to activate the mask alarm includes:

reading data from the NIR anti-mask system for a first predetermined period of time;

determining whether the data from the NIR anti-mask system for the first predetermined period of time is indicative of the masking material located within the predetermined distance from the optical window of the intrusion detector;

when the data from the NIR anti-mask system for the first predetermined period of time is indicative of the masking material located within the predetermined distance from the optical window of the intrusion detector:

deactivating the NIR anti-mask system;

waiting a second predetermined period of time;

activating the NIR anti-mask system;

reading data from the NIR anti-mask system for a third predetermined period of time;

determining whether the data from the NIR anti-mask system for the third predetermined period of time is indicative of a the masking material located within the predetermined distance from the optical window of the intrusion detector; and when the data from the NIR anti-mask system for the third predetermined period of time is indicative of the masking material located within the predetermined distance from the optical window of the intrusion detector, activating the mask alarm and deactivating the NIR anti-mask system.

4. The method of claim 3 wherein, when the data from the NIR anti-mask system for the third predetermined period of time is not indicative of the masking material located within the predetermined distance from the window of the intrusion detector, deactivating the NIR anti-mask system, activating a video imager to capture at least one image, determining whether the captured image is blurred or blank, and when the captured image is blurred or blank, activating the mask alarm.

5. A method comprising:

reading data from a capacitive sensor located within an intrusion detector;

comparing the data from the capacitive sensor to a baseline to determine whether the data from the capacitive sensor is indicative of a masking material on or near an optical window of the intrusion detector; and when the data from the capacitive sensor is indicative of the masking material on or near the optical window of the intrusion detector, activating an anti-mask system to capture additional data from an ambient environment for determining whether to activate a mask alarm, wherein the anti-mask system includes a video imager and a PIR (passive infrared) sensor, and wherein capturing the additional data from the ambient environment for determining whether to activate the mask alarm includes:

reading additional data from the capacitive sensor;

determining whether the additional data from the capacitive sensor is indicative of the masking material remaining within a predetermined distance from the optical window of the intrusion detector;

when the additional data from the capacitive sensor is indicative of the masking material exiting the predetermined distance from the optical window of the intrusion detector:

instructing the video imager to capture at least one image;

determining whether the captured image is blurred or blank; and when the captured image is blurred or blank, activating the mask alarm and deactivating the video imager and the PIR sensor; and when the additional data from the capacitive sensor is indicative of the masking material remaining within the predetermined distance from the optical window of the intrusion detector:

determining whether the predetermined period of time has elapsed; and when the predetermined period of time has elapsed, activating the mask alarm.

6. The method of claim 5 wherein, when the captured image is not blurred or blank, determining whether the captured image includes human motion, and when the captured image does not include human motion, deactivating the video imager and the PIR sensor.

7. The method of claim 6 wherein, when the captured image includes human motion, determining whether the PIR sensor detects a human presence, and when the PIR sensor does not detect the human presence, activating the mask alarm and deactivating the video imager and the PIR sensor.

8. The method of claim 7 wherein, when the PIR sensor detects the human presence, deactivating the video imager and the PIR sensor.

9. An intrusion detector comprising:

an optical system containing an optical window;

a capacitive sensor;

a mask alarm;

an anti-mask system;

a programmable processor; and executable control software stored on a non-transitory computer readable medium, wherein the programmable processor and the executable control software read data from the capacitive sensor, wherein the programmable processor and the executable control software compare the data from the capacitive sensor to a baseline to determine whether the data from the capacitive sensor is indicative of a spike caused by application of a masking material on or near the optical window, wherein, when the data from the capacitive sensor is indicative of the spike caused by application of the masking material on or near the optical window, the programmable processor and the executable control software activate the anti-mask system to capture additional data from an ambient environment for determining whether to activate the mask alarm, wherein the anti-mask system includes a video imager and an NIR (near infrared) anti-mask system, wherein, when the data from the capacitive sensor is indicative of the masking material on or near the optical window, the programmable processor and the executable control software activate the NIR anti-mask system and read data from the NIR anti-mask system, wherein, when the data from the NIR anti-mask system is indicative of the masking material located within the predetermined distance from the optical window, the programmable processor and the executable control software activate the mask alarm, and wherein, when the data from the NIR anti-mask system is not indicative of the masking material located within the predetermined distance from the optical window, the programmable processor and the executable control software deactivate the NIR anti-mask system, activate the video imager, determine whether an image captured by the video imager is blurred or blank, and, when the captured image is blurred or blank, activate the mask alarm.

10. An intrusion detector comprising:

an optical system containing an optical window;

a capacitive sensor;

a mask alarm;

an anti-mask system;

a programmable processor; and executable control software stored on a non-transitory computer readable medium, wherein the programmable processor and the executable control software read data from the capacitive sensor, wherein the programmable processor and the executable control software compare the data from the capacitive sensor to a baseline to determine whether the data from the capacitive sensor is indicative of a spike caused by application of a masking material on or near the optical window, wherein, when the data from the capacitive sensor is indicative of the spike caused by application of the masking material on or near the optical window, the programmable processor and the executable control software activate the anti-mask system to capture additional data from an ambient environment for determining whether to activate the mask alarm, wherein the programmable processor and the executable control software read the additional data from the capacitive sensor and determine when the additional data from the capacitive sensor is indicative of the masking material on or near the optical window, wherein, when the additional data from the capacitive sensor is indicative of the masking material on or near the optical window, the programmable processor and the executable control software activate the mask alarm, wherein the anti-mask system includes a video imager and a PIR (passive infrared) sensor, and wherein, when the additional data from the capacitive sensor is not indicative of the masking material on or near the optical window, the programmable processor and the executable control software activate the video imager and the PIR sensor and analyze data from the video imager and the PIR sensor to determine whether to activate the mask alarm.

* * * * *